(12) United States Patent
Ju et al.

(10) Patent No.: US 7,675,917 B2
(45) Date of Patent: Mar. 9, 2010

(54) METHOD FOR PROVIDING PACKET DATA SERVICE IN A WIRELESS COMMUNICATION SYSTEM

(75) Inventors: Mi-Suk Ju, Anyang-shi (KR); Dae-Joong Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 2160 days.

(21) Appl. No.: 10/241,195

(22) Filed: Sep. 11, 2002

(65) Prior Publication Data
US 2003/0067923 A1   Apr. 10, 2003

(30) Foreign Application Priority Data
Sep. 11, 2001   (KR)   .......................... 10-2001-55853

(51) Int. Cl.
*H04L 12/56*   (2006.01)

(52) U.S. Cl. .................................. 370/395.3; 370/401
(58) Field of Classification Search .............. 370/395.3, 370/395.52, 389, 401, 471, 352, 493, 902
See application file for complete search history.

(56) References Cited

U.S. PATENT DOCUMENTS

| | | | |
|---|---|---|---|
| 6,324,577 B1 * | 11/2001 | Hirai | 709/223 |
| 6,427,170 B1 * | 7/2002 | Sitaraman et al. | 709/226 |
| 6,771,609 B1 * | 8/2004 | Gudat et al. | 370/254 |
| 7,010,585 B2 * | 3/2006 | Asami | 709/220 |
| 7,143,187 B1 * | 11/2006 | Takeda et al. | 709/245 |
| 7,193,985 B1 * | 3/2007 | Lewis et al. | 370/338 |
| 2002/0186696 A1 * | 12/2002 | Lim | 370/395.52 |

* cited by examiner

*Primary Examiner*—Chi H Pham
*Assistant Examiner*—Alexander Boakye
(74) *Attorney, Agent, or Firm*—The Farrell Law Firm, LLP

(57) ABSTRACT

Discloses is a method for providing a packet data service in a wireless communication system. A packet data service node (PDSN) or a home agent (HA) allocates an IP (Internet Protocol) address to a mobile station and then registers the allocated IP address information in a DNS (Domain Naming System) server along with a domain name of the mobile station. Alternatively, upon receiving an accounting request message from the packet data service node, an AAA (Authentication, Authorization and Accounting) server registers the IP address information of the mobile station in the DNS server in association with the domain name of the mobile station. Thus, a correspondent node (CN), though it does not recognize the IP address of the mobile station, can access the mobile station using the domain name.

16 Claims, 13 Drawing Sheets

| Item | Parameter | Length | Field |
|---|---|---|---|
| Mobile ID | MSID | 15 | Calling_ID |
| User ID | IP Address | 4 | Framed IP Address |
| | Network Access ID | 64 | User Name |
| Session ID | Account Session ID | 8 | Acct_Session_ID |
| | Correlation ID | 8 | Correlation_ID |
| | Session Continue | 4 | 3GPP2_Session_Cont |
| Infra Structure ID | MIP Home Agent(HA) | 4 | 3GPP2_HA_IP_Addr |
| | PDSN/FA Address | 4 | NAS Address |
| | Serving PCF | 4 | 3GPP2_PCF_IP_Addr |
| | BSID | 12 | 3GPP2_BSID |
| Session Status | ... | ... | ... |
| Session Activity | ... | ... | ... |

FIG.2

METHOD FOR PROVIDING PACKET DATA SERVICE IN A WIRELESS COMMUNICATION SYSTEM

PRIORITY

This application claims priority to an application entitled "Method for Providing Packet Data Service in a Wireless Communication System" filed in the Korean Industrial Property Office on Sep. 11, 2001 and assigned Serial No. 2001-55853, the contents of which are incorporated herein by reference.

BACKGROUND OF THE INVENTION

1. Field of the Invention

The present invention relates generally to a wireless communication network, and in particular, to a method for supporting packet destination in a wireless communication system supporting a packet data service.

2. Description of the Related Art

With the development of the communication technology, various techniques for combining an IP (Internet protocol)-based packet network with a wireless communication network have been proposed. A most typical one of those techniques is CDMA 2000 (Code Division Multiple Access 2000) system. In the CDMA 2000 system, voice or data is transmitted to an IP network over an IP packet, and the IP network transmits the IP packet to a mobile station (MS, or mobile node or mobile host) having a unique IP address. Similarly, the mobile station with the unique IP address transmits the IP packet to a correspondent node (CN). The term "packet call service" as used herein refers to all kinds of a packet-based voice or data call transmitted from a transmitter to a receiver over the whole or partial route there between.

In a wireless communication system supporting such packet communication, in order to be provided with a packet call service, a mobile station must have a unique address so that the mobile station can be identified in a packet network. In an IP network, the unique address becomes an IP address. Preferably, mobile stations must each have their own unique IP address. However, since the number of available IP addresses is limited, a technique for temporarily allocating an IP address only when a packet call is connected is chiefly used.

In a CDMA 2000 1x wireless communication system, nodes capable of allocating an IP address to a mobile station include a packet data service node (PDSN) and a home agent (HA). The packet data service node allocates an IP address to a mobile station requiring a Simple IP allocation service, while the home agent allocates an IP address to a mobile station requiring a Mobile IP allocation service. An IP address allocated by the packet data service node is deleted when the service is ended, whereas an IP address allocated by the home agent remains unchanged unless the mobile station moves to coverage of another home agent (i.e., to another domain).

In this case, an IP address allocated to a mobile station is changed each time the mobile station accesses a packet network and initiates a service, or each time a handoff occurs as the mobile station changes an access point (or position) of the packet network. Therefore, a common Internet user cannot recognize a current IP address of a mobile station with which he or she desires to communicate, so it is not possible to set up a packet data destination call to the mobile station. That is, when dynamically allocating an IP address to a mobile station, a correspondent node cannot recognize an IP address of the mobile station, so that the correspondent node cannot first initiate communication. This means that the mobile station can support packet call origination but cannot support packet call destination. Therefore, the mobile station cannot serve as an Internet server.

SUMMARY OF THE INVENTION

It is, therefore, an object of the present invention to provide a method for providing a packet destination call service to a mobile station that is dynamically allocated an IP address.

It is another object of the present invention to provide a method for registering an IP address and a domain name of a mobile station in a DNS (Domain Naming System) server each time an IP address is allocated to the mobile station, and allowing a packet call origination user to initiate a packet data call using a domain name of a mobile station which receives a packet.

It is further another object of the present invention to provide a method for registering an IP address and a domain name of a mobile station in a DNS server using an AAA (Authentication, Authorization and Accounting) server in a packet network.

It is yet another object of the present invention to provide a method for registering an IP address and a domain name of a mobile station in a DNS server by a packet data service node (PDSN) or a home agent (HA) in a packet network.

According to a first aspect of the present invention, there is provided a method for accessing a packet data service through an Internet service network by a mobile station having a unique domain name. The method comprises allocating an IP address for the packet data service to the mobile station; storing the domain name and the allocated IP address matched to the domain name in a DNS server; and providing the packet data service to the mobile station using the IP address matched to the domain name.

According to a second aspect of the present invention, there is provided a method for supporting a packet data service of a mobile station by an AAA server in a wireless communication system. The method comprises receiving an accounting start request message indicating that a data session for a packet data service to a mobile station is set up; and performing an accounting process in response to the accounting start request message and transmitting to a DNS server a DNS update request message including an IP address allocated to the mobile station and a domain name granted to the mobile station.

According to a third aspect of the present invention, there is provided a method for supporting a packet data service of a mobile station by an AAA server in a wireless communication system. The method comprises setting a data session with the mobile station and receiving an accounting stop request message indicating release of the data session during a packet data service, using an IP address allocated to the mobile station and a domain name granted to the mobile station; and performing an accounting process in response to the accounting stop request message, and transmitting to a DNS server a DNS delete request message including the IP address of the mobile station and the domain name of the mobile station.

According to a fourth aspect of the present invention, there is provided a method for supporting a packet data service of a mobile station in a wireless communication system. The method comprises setting up a data session for a packet data service with a mobile station, and allocating an IP address for the packet data service to the mobile station; and transmitting to a DNS server a DNS update request message including the allocated IP address and a domain name granted to the mobile station.

According to a fifth aspect of the present invention, there is provided a method for supporting a packet data service of a mobile station in a wireless communication system. The method comprises setting up a data session with the mobile station, and releasing the data session with the mobile station during a packet data service, using an IP address allocated to the mobile station and a domain name granted to the mobile station; and transmitting to a DNS server a DNS delete request message including the IP address and the domain name of the mobile station.

BRIEF DESCRIPTION OF THE DRAWINGS

The above and other objects, features and advantages of the present invention will become more apparent from the following detailed description when taken in conjunction with the accompanying drawings in which:

FIG. 2 illustrates a format of an accounting message collected by an AAA server according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention, when an IP address is allocated to a mobile station, registers the allocated IP address in a DNS (Domain Naming System) server along with a domain name granted to the mobile station. Herein, the present invention will be described with reference to a CDMA 2000 1x system, one of synchronous CDMA communication systems. However, it will be understood by those skilled in the art that various changes in form and details may be made in a technique for providing a destination a packet data service, a major object of the present invention, without departing from the spirit and scope of the invention.

Figure 1:
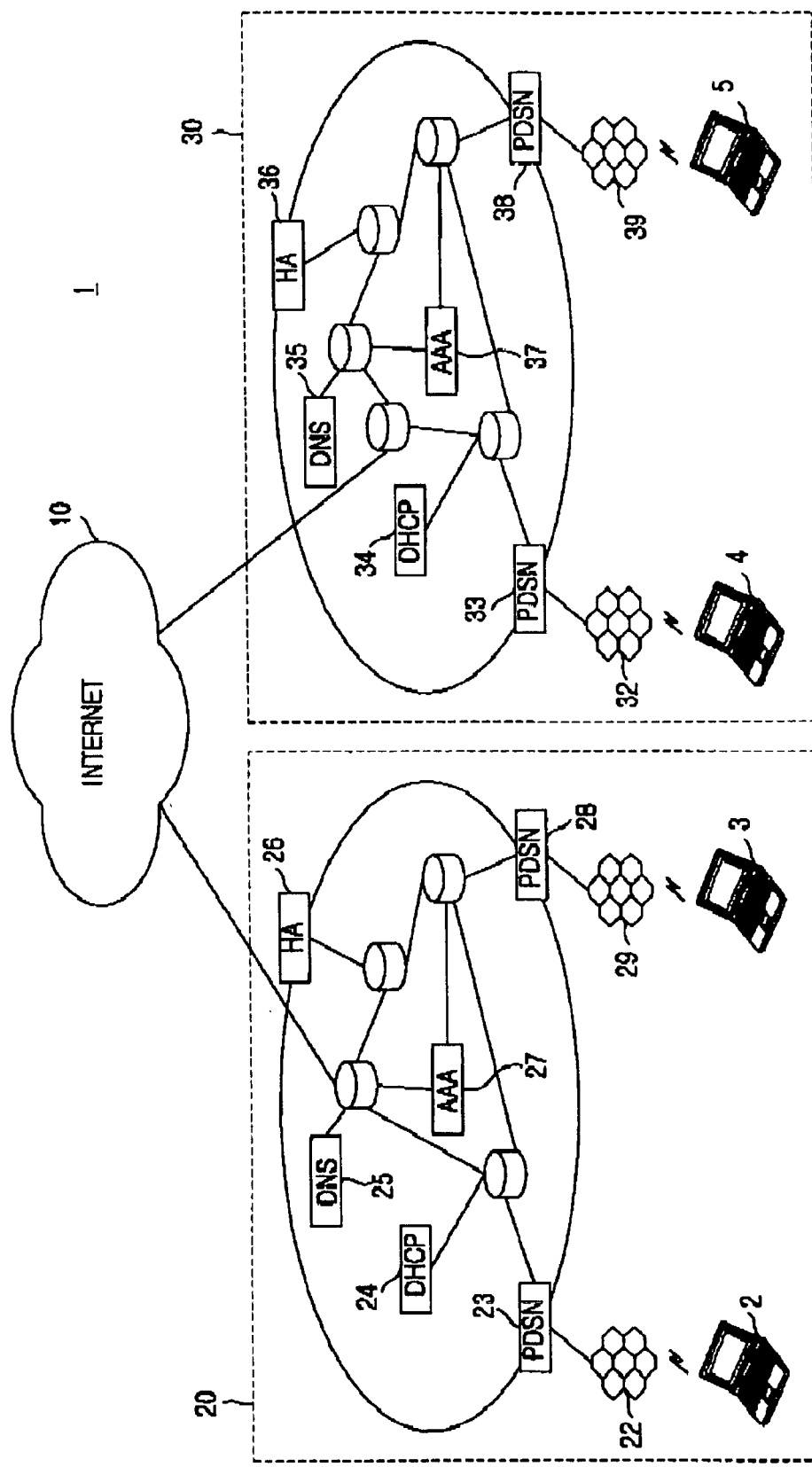
FIG. 1 is a block diagram illustrating a structure of a wireless packet data communication system to which the present invention is applied.

FIG. 1 illustrates a wireless packet data communication system to which the present invention is applied. Referring to FIG. 1, a packet data communication system is constructed based on domains 20 and 30 connected to each other through the Internet 10. The domains 20 and 30 each are comprised of a plurality of network elements for supporting a wireless packet call service. The network elements include a home agent (HA) 26 (or 36) for managing mobility information of mobile stations (MSs) 2 and 3 (or 4 and 5) and supporting a Mobile IP allocation service, packet data service nodes (PDSNs) 23 and 28 (or 33 and 38) each connected to wireless access networks 22 and 29 (or 32 and 39), an AAA (Authentication, Authorization and Accounting) server 27 (or 37), a DNS server 25 (or 35), and a DHCP (Dynamic Host Configuration Protocol) server 24 (or 34). The wireless access networks 22, 29, 32 and 39 each include a base transceiver station (BTS) and a base station controller (BSC) used in digital cellular network, PCS (Personal Communication System) network, and IMT-2000 (International Mobile Telecommunication-2000) network known as a next generation wireless communication network including CDMA 2000 and UMTS (Universal Mobile Telecommunication System) networks. Meanwhile, a packet data service node is also referred to as a foreign agent (FA).

The mobile stations 2, 3, 4 and 5 perform a function of a mobile host defined in RFC (Request For Contents) 2002 and access the wireless access networks 22, 29, 32 and 39 through wireless channels. The packet data service nodes 23, 28, 33 and 38 are a kind of router for connecting the wireless access networks 22, 29, 32 and 39 to the Internet 10. To this end, the packet data service nodes 23, 28, 33 and 38 convert data packets from the wireless access networks 22, 29, 32 and 39 into IP packets, and vice versa.

In particular, the packet data service nodes 23, 28, 33 and 38, and the home agents 26 and 36 allocate dynamic IP addresses to the mobile stations 2, 3, 4 and 5, in the manner described in the RFC 2002. Here, an IP addresses allocated by the packet data service node is changed each time a mobile station accesses a service or each time the mobile station moves to coverage (or domain) of another packet data service node. However, an IP address allocated by the home agent is fixed in the corresponding domain.

The AAA servers 27 and 37 perform authentification, authorization and accounting on a subscriber who desires packet data communication, and are connected to other network elements through security channels. The DNS servers 25 and 35, naming systems for mapping IP addresses to domain names, map variable IP addresses to fixed domain names by dynamically updating domain names at the request of network elements. As is well known, the domain names, letter-type addresses used to identify hosts accessing the Internet, are easier to remember and more intuitive compared with the IP addresses that are simply comprised of numbers. A correspondent node accessing the Internet by the DNS server can access another node using a domain name.

A method for mapping an IP address of a mobile station to a domain name of the mobile station is divided into a first embodiment in which the mapping is performed by the AAA server and a second embodiment in which the mapping is performed by the packet data service node or the home agent. Therefore, a principle of the present invention will be separately described for the first embodiment and the second embodiment.

First Embodiment

In the first embodiment, if an IP address is allocated to a mobile station, an AAA server registers the allocated IP address and a domain name of the mobile station in a DNS server. This is available because a message for accounting and authentication is transmitted from a packet data service node to the AAA server each time the mobile station makes an access to be allocated an IP address. To this end, the AAA server includes a DNS client program, or an operating program required for the present invention, and the operating program performs a message exchange between the AAA server and the DNS server.

By means of the operating program, the AAA server registers a network access identifier (NAI), or name and IP address of a mobile host in the DNS server, and performs DNS update through a security channel if an IP address is allocated to the mobile station. To that end, the AAA server stores an attribute field indicating whether packet data call destination is supportable, as a part of user service profile information of the corresponding mobile station.

Now, a description will be made of an accounting operation by the AAA server. Accounting information for a wireless data service is generated by a base station controller or a packet data service node, and the accounting information is collected and managed by the AAA server. The packet data service node transmits an Accounting Start Request message to the AAA server when setting a new session for packet data communication or initiating a packet call service. Further, the packet data service node transmits an Accounting Stop Request message to the AAA server when releasing the session.

FIG. 2 illustrates a format of an accounting message collected by the AAA server according to an embodiment of the present invention. Referring to FIG. 2, the accounting message includes Mobile item, User item, Account item, Session item, Infrastructure item, Session Status item and Session Activity item.

The Mobile item includes a mobile station identifier (MSID) of a calling party, and the User item includes an IP address and NAI (Network Access Identifier) of the calling party. The Account item includes an Accounting State Type field indicating a Start request or a Stop request, and the Session item includes an Account Session Identifier field, a Session Identifier (or Correlation ID) field, a Session Continue field indicating Session Continue or Session Stop, and a Session Start field indicating Session Continue, Session Start and Session Stop. The Infrastructure item includes an IP address of a home agent (MIP Home Agent), and an IP address of a packet data service node (PDSN/FA Address).

Figure 3:
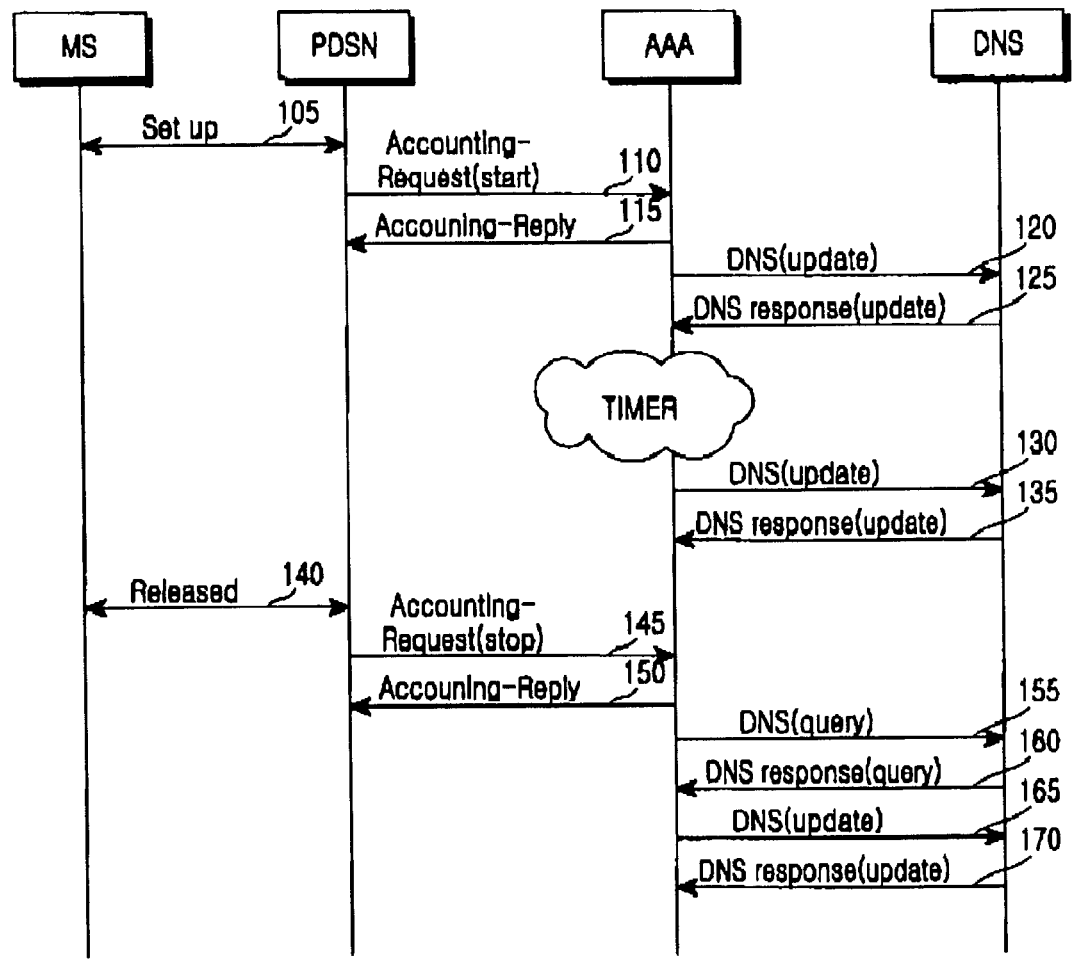
FIG. 3 is a message flow diagram illustrating a procedure for registering a domain name by an AAA server according to a first embodiment of the present invention.

FIG. 3 illustrates a message flow diagram illustrating a procedure for registering a domain name by an AAA server according to a first embodiment of the present invention. Referring to FIG. 3, in step 105, a packet data service node (PDSN) allocates an IP address through a known IPCP (IP Configuration Protocol) process when setting up a PPP (Point-to-Pont Protocol) data session in order to initiate a packet call with a mobile station (MS). In another case, the mobile station sets up a Mobile IP data session, and is allocated an IP address from a home agent (HA). A procedure for allocating an IP address is well known in the art, so a detailed description of the procedure will not be provided.

After allocating the IP address, the packet data service node transmits in step 110 an Accounting Start Request message, or an Account message with an Accounting State Type field set to '1' to the AAA server. Here, the Account message has the format illustrated in FIG. 2. Upon receiving the Accounting Start Request message, the AAA server performs a normal accounting process (of storing MSID, Session ID and account start time) and then, transmits an Accounting Reply message to the packet data service node in step 115.

The Accounting process is performed in a PPP authentication step by the packet data service node in the case of a Simple IP allocation service, or performed in a Mobile IP registration step by the home agent in the case of a Mobile IP allocation service. That is, when PPP connection setup for the Simple IP allocation service is completed or Mobile IP data session setup for the Mobile IP allocation service is completed, the packet data service node transmits an Accounting Start Request message to the AAA server.

In step 120, the AAA server transmits to the DNS server a DNS update request message including the allocated IP address and a user domain name granted to the mobile station in response to the Accounting Start Request message. The DNS server then accomplishes a process of registering the domain name in response to the DNS update request message, and transmits to the AAA server in step 125 a DNS update response message. A detailed procedure for transmitting the DNS update request message by the AAA server will be described with reference to FIGS. 4 and 5.

The DNS server sets a valid time TTL of each resource record for user domain names, and automatically flushes (or deletes) the record after a lapse of the valid time. Therefore, after transmitting the DNS update request message, the AAA server monitors a timer set to a valid time for a corresponding mobile station. If the timer expires, the AAA server retransmits the DNS update request message to the DNS server in step 130. The DNS server then adjusts a valid time TTL of a resource record for a domain name of the mobile station, requested by the DNS update request message, and transmits in step 135 a DNS update response message to the AAA server.

If a data session set up between the mobile station and the packet data service node is released in step 140, the packet data service node transmits to the AAA server in step 145 an Accounting Stop Request message for the released data session, i.e., an Account message with an Account State Type field set to '0'. Here, the Account message has the format illustrated in FIG. 2. The AAA server then performs an accounting process (of calculating a charge) in response to the Accounting Stop Request message, and transmits to the packet data service node in step 150 an Accounting Reply message.

Meanwhile, the AAA server recognizes release of the data session of the mobile station by the Accounting Stop Request message, and transmits to the DNS server in step 155 a DNS query message in order to delete a resource record of the corresponding mobile station from the DNS server. In step 160, the DNS server transmits to the AAA server a DNS query response message including a registered IP address corresponding to the domain name of the mobile station.

The AAA server analyzes the DNS query response message and determines whether the registered IP address of the mobile station is identical to an IP address to be deleted. This is to prevent a registered new IP address from being deleted, when the new IP address of the mobile station has already been registered in the DNS server due to, for example, a handoff between packet data service nodes. That is, the AAA server compares an IP address recognized by the AAA server itself with an IP address included in the DNS query response message. As a result of the comparison, if they are identical to each other, the AAA server transmits to the DNS server in step 165 a DNS delete request message for deleting the registered IP address, and receives a DNS delete response message in step 170. A detailed procedure for deleting a domain name by the AAA server will be described with reference to FIG. 6.

If a data session for the Simple IP allocation service is set up or a Mobile IP data session for the Mobile IP allocation service is set up, a packet data call alternates between a dormant state and an active state. The "dormant state" means a state in which a connection between a wireless communication system and a mobile station is temporarily cut off because there is no transmission data for a preset time period. The "active state" means a state in which there is transmission data.

In the dormant state or active state, the packet data service node repeatedly transmits the Accounting Start Request message and the Accounting Stop Request message in order to prevent the AAA server from generating an accounting error or losing an accounting message. Here, the Accounting Start Request message and the Accounting Stop Request message pair include the same Account Session Identifier. The Account Session Identifier is different from a Session Identifier which continues for one data session. The AAA server calculates final accounting information by summing up accounting information calculated using several Accounting Start/Stop Request Message pairs.

Figure 4:
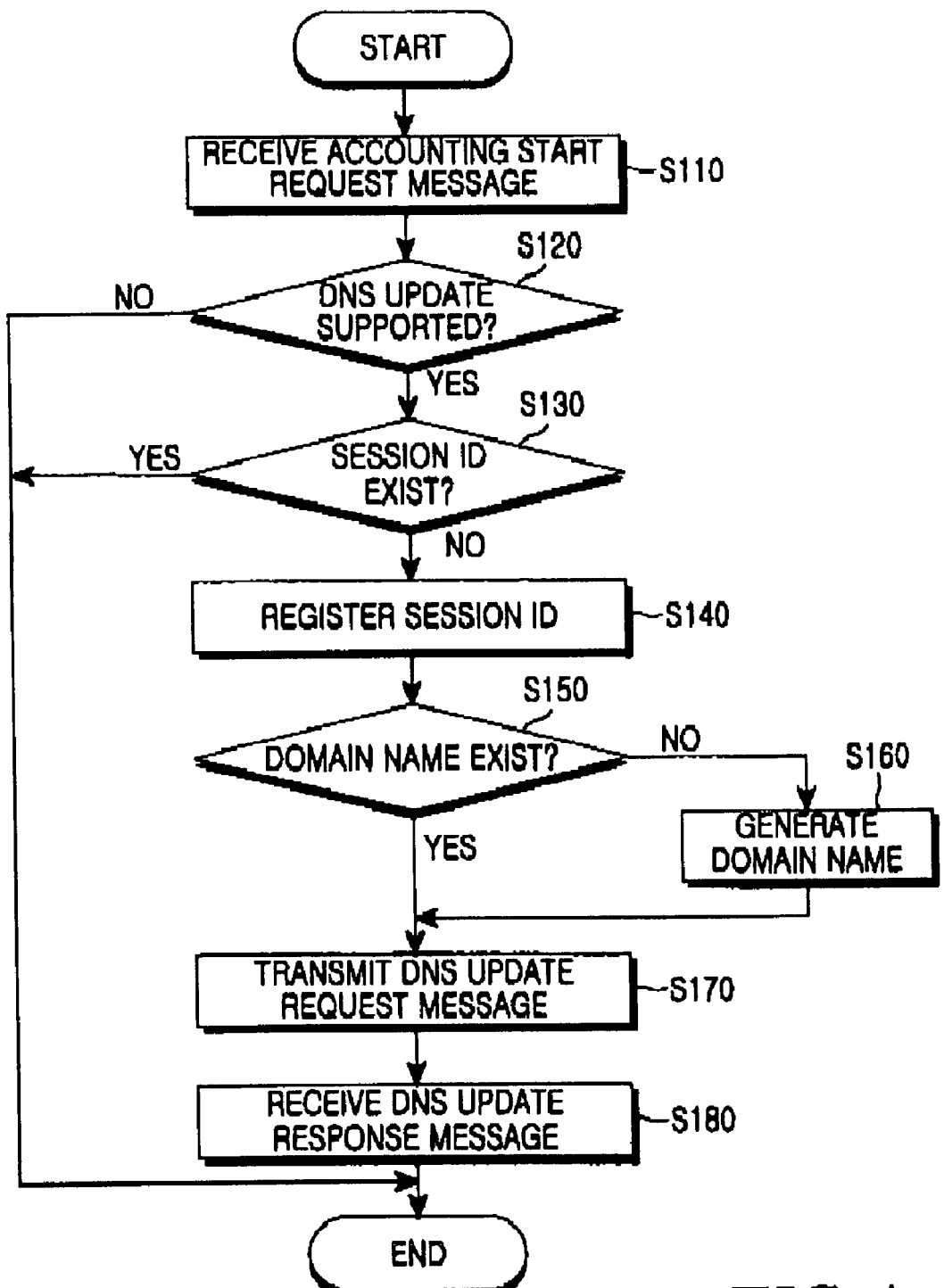
FIGS. 4 and 5 are flow charts illustrating two different procedures for registering a domain name by an AAA server according to the first embodiment of the present invention.
Figure 5:
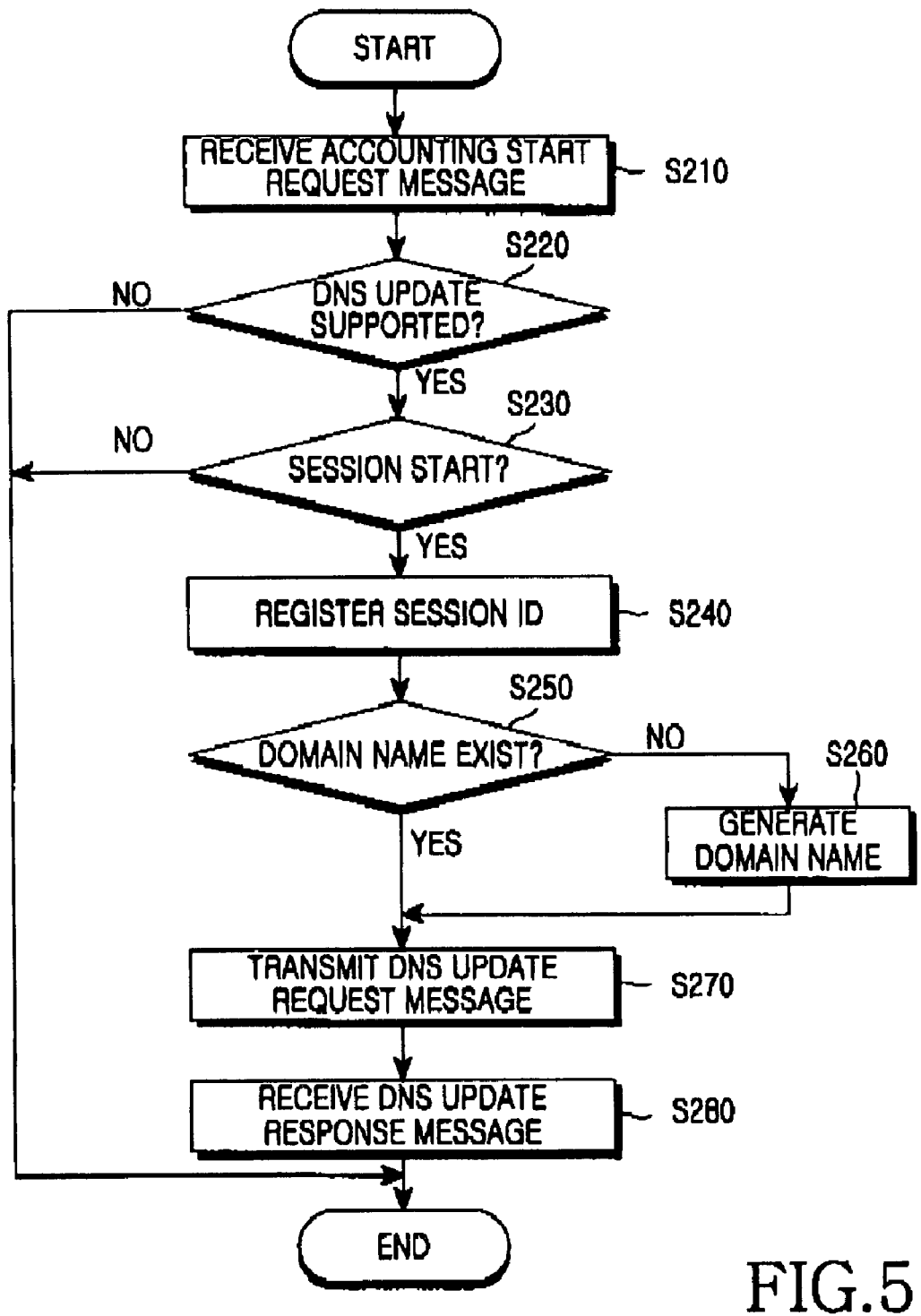

While one data session continues, the AAA server receives a plurality of Accounting Start Request messages. Therefore, the AAA server must transmit a DNS update request message only once when it distinguishes an Accounting Start Request message indicating an actual start of the data session and starts the data session. FIGS. 4 and 5 illustrate a method for recognizing a start of a data session using a Session ID field by the AAA server and another method for recognizing a start of the data session using a Session Start field by the AAA server, respectively. That is, in FIG. 4, the AAA server determines a start of a data session using a Session ID field included in the Accounting Start Request message, and in FIG. 5, the AAA server determines a start of a data session using a Session Start field included in the Accounting Start Request message.

Referring to FIG. 4, in step S110, an AAA server receives an Accounting Start Request message from a packet data service node, performs an accounting process, and transmits an Accounting Reply message to the packet data service node, and then proceeds to step S120. Here, a format of the Accounting Start Request message includes MSID, IP address and Session ID, illustrated in FIG. 2.

In step S120, the AAA server determines whether a corresponding mobile station is a subscriber who has requested a DNS registration service, by consulting a DNS server update field in a previously stored user service profile database. The DNS server update field used in determining whether a DNS registration service is supportable is illustrated in Table 1, by way of example.

TABLE 1

| Parameter Name | DNS Server Update |
| --- | --- |
| Format | Integer |
| Value | 0: DNS registration service non-supportable |
|  | 1: DNS registration service supportable |

In the case of a Mobile IP allocation service, a home agent performs DNS update by getting information on the DNS registration service from an Access-Accept message received from an AAA server in a home domain in a Mobile IP registration process, and provides the result to an AAA server in a current domain.

As a result of the determination in step S120, if the mobile station has subscribed to the DNS registration service, the AAA server determines in step S130 whether a Session ID included in the Accounting Start Request message has already been registered. As a result of the determination, if the Session ID has been registered, the AAA server ends the procedure under the judgment that domain name registration on the session has already been performed. However, if the Session ID has not been registered, the AAA server stores a Session ID included in the Accounting Start Request message in its internal DNS register in step S140, and then proceeds to step S150.

If a mobile station being provided with the Mobile IP allocation service performs a handoff between packet data service nodes, a target packet data service node transmits an Accounting Start Request message to the AAA server. In this case, an IP address of the mobile station is identical in both packet data service nodes, but a Session ID is different, so the AAA server performs DNS registration.

In step S150, the AAA server determines whether a domain name of the mobile station has already been stored. A domain name is stored in a user domain name field of the user service profile database. If no domain name is stored in the user domain name field, the AAA server generates in step S160 a domain name of the mobile station according to a prescribed rule. For example, when NAI 'userid@realm' composed of a user identifier of a mobile station and a name of a service provider is used, a user domain name of the mobile station can simply become 'userid.realm'.

The generated domain name is added to the user service profile of the AAA server as a domain name field. The domain name field of the user service profile can be expressed as illustrated in Table 2, by way of example.

TABLE 2

| Parameter | User's Domain Name |
| --- | --- |
| Format | String |
| Value | (domain name) |

Figure 7:
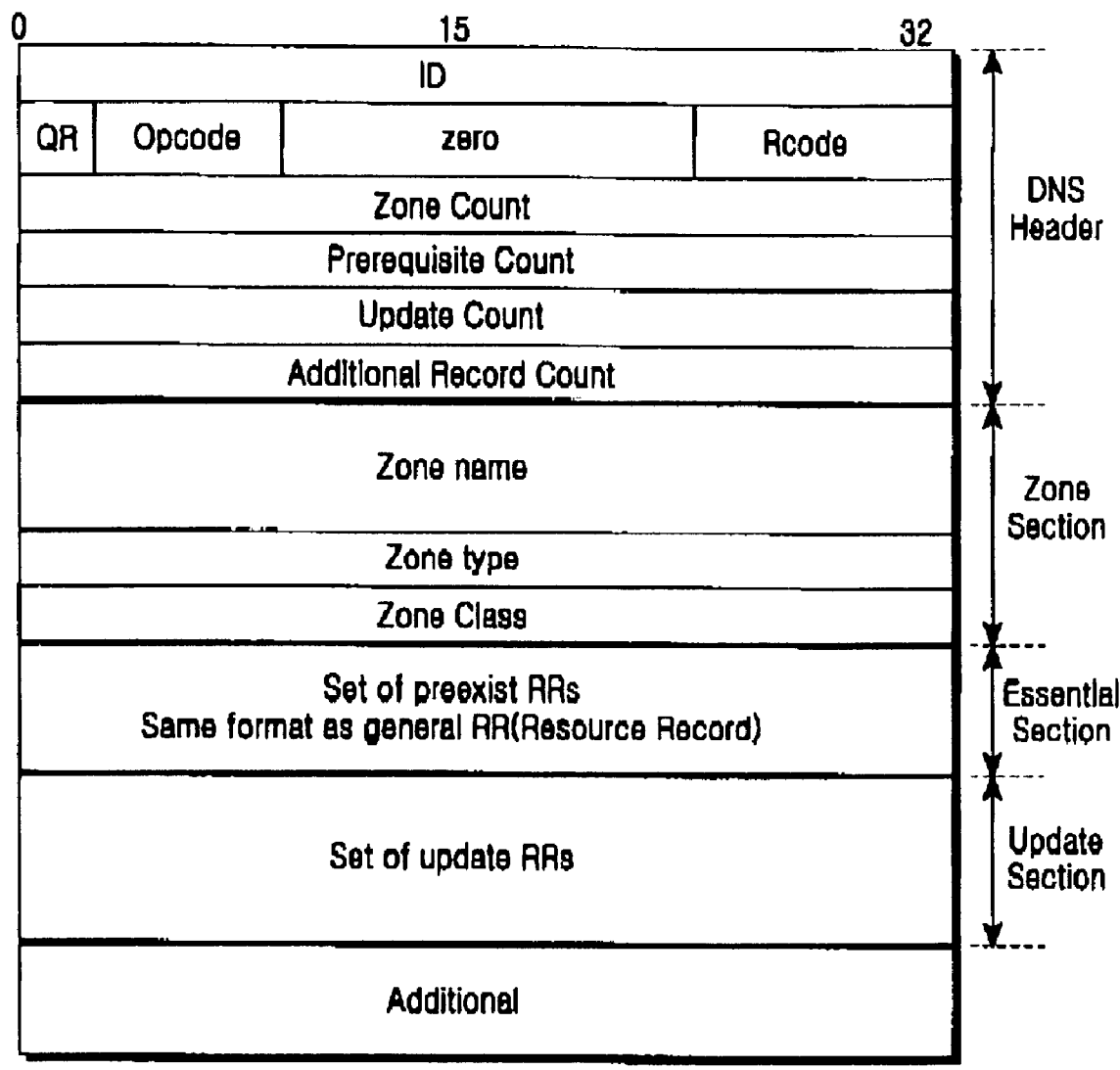
FIG. 7 illustrates a format of a DNS update/delete message.

In step S170, the AAA server generates a DNS update request message using an IP address included in the Accounting Start Request message and the domain name generated (or previously stored) in step S160, and transmits the generated DNS update request message to the DNS server. A format of the DNS update request message is illustrated in detail in FIG. 7, and the contents of the major fields used in the present invention are as follows (see RFC 2136).

DNS Header

Q/R=0 (request)

opcode=5 (update)

Update section name=MS's domain name type=1 (host address)

class=1 (Internet)

TTL=life time defined

RDATA=MS's IP address

If the DNS server accomplishes a corresponding process in response to the DNS update request message and then transmits a DNS update response message, the AAA server receives in step S180 the DNS update response message and recognizes that the DNS update has been successfully performed. A format of the DNS update response message is illustrated in detail in FIG. 7, and the contents of the major fields used in the present invention are as follows.

DNS Header
    Q/R=0 (request)
    opcode=5 (update)
    Update section
    name=MS's domain name
    type=1 (host address)
    class=1 (Internet)
    TTL=life time defined
    RDATA=MS's IP address Next, referring to FIG. 5, in step S210, an AAA server receives an Accounting Start Request message from a packet data service node, performs an accounting process, and transmits an Accounting Reply message to the packet data service node, and then proceeds to step S220. Here, a format of the Accounting Start Request message includes MSID, IP address and Session ID, illustrated in FIG. 2.

In step S220, the AAA server determines whether a corresponding mobile station is a subscriber who has requested a DNS registration service, by consulting a DNS server update field in a previously stored user service profile database. The DNS server update field is illustrated in Table 1, by way of example. In the case of a Mobile IP allocation service, a home agent provides the AAA server with information indicating whether the corresponding mobile station has subscribed to the DNS registration service.

As a result of the determination, if the mobile station has subscribed to the DNS registration service, the AAA server determines in step S230 whether a Session Start field included in the Accounting Start Request message received in step S210 is set to a value, for example, '1' indicating a start of a data session.

As a result of the determination, if the Session Start field is not set to the value indicating a start of the data session, the AAA server ends the procedure under the judgment that domain name registration on the current session has already been performed. However, if the Session Start field is set to the value indicating a start of the data session, the AAA server stores a Session ID included in the Accounting Start Request message in its internal DNS register in step S240, and then proceeds to step S250.

In step S250, the AAA server determines whether a domain name of the mobile station has already been stored in a user domain field of the user profile database. If no domain name is stored in the user domain name field, the AAA server generates a user domain name according to a prescribed rule in step S260. Here, the rule for generating the domain name is the same as described before.

In step S270, the AAA server generates a DNS update request message using an IP address included in the Accounting Start Request message and the domain name generated (or previously stored) in step S260, and transmits the generated DNS update request message to the DNS server. If the DNS server performs a corresponding process in response to the DNS update request message and then transmits a DNS update response message, the AAA server receives in step S280 the DNS update response message and recognizes that the DNS update has been successfully performed. The DNS update request message and the DNS update response message have the format illustrated in Table 7.

Figure 6:
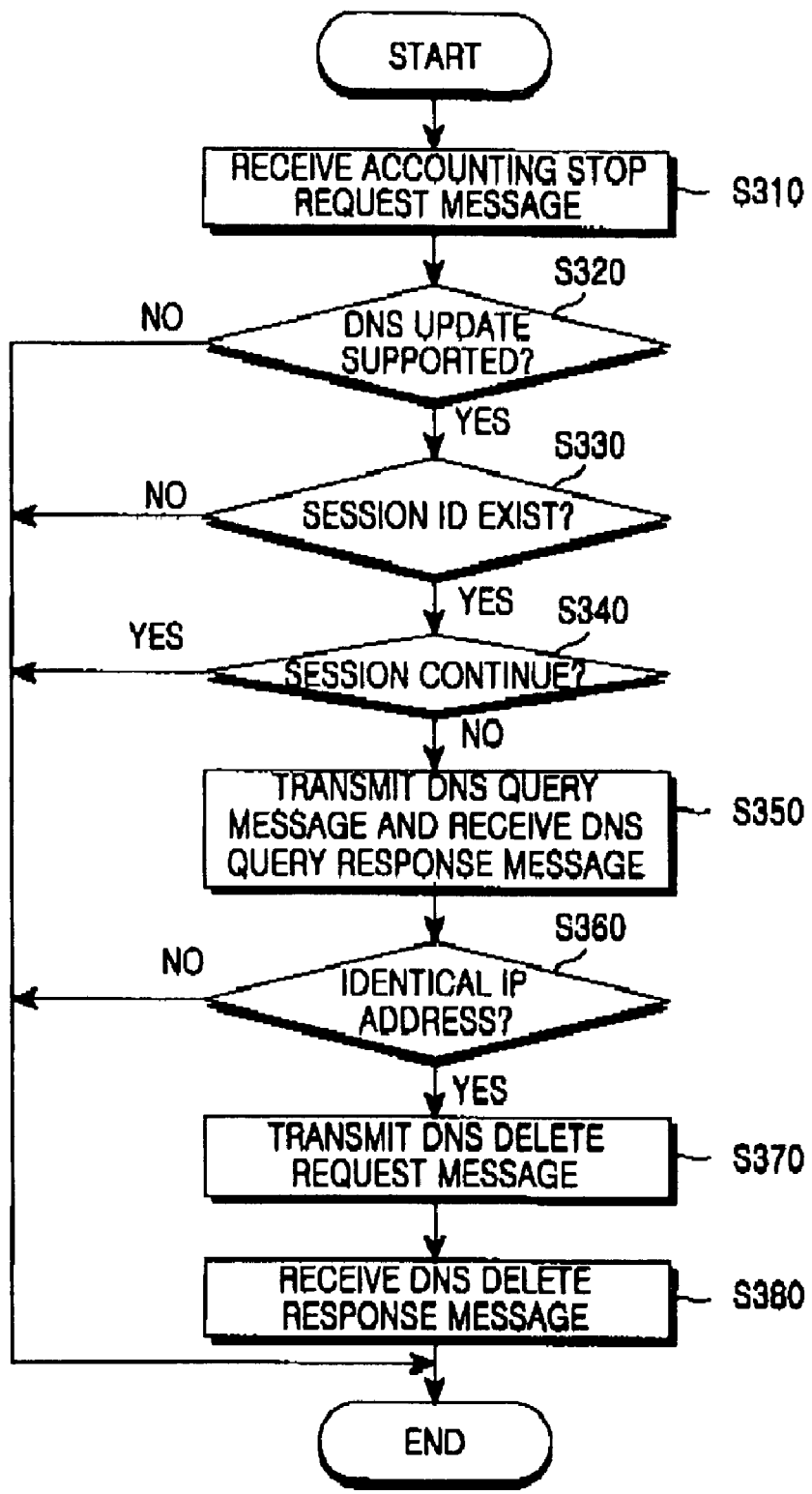
FIG. 6 is a flow chart illustrating a procedure for deleting a domain name by an AAA server according to the first embodiment of the present invention.

FIG. 6 is a flow chart illustrating a procedure for deleting a domain name by an AAA server according to the first embodiment of the present invention. Referring to FIG. 6, in step S310, an AAA server receives an Accounting Stop Request message from a packet data service node, performs a corresponding accounting process, and transmits an Accounting Reply message to the packet data service node, and then proceeds to step S320. Here, a format of the Accounting Stop Request message includes MSID, IP address and Session ID, illustrated in FIG. 2.

In step S320, the AAA server determines whether a corresponding mobile station is a subscriber who has requested a DNS registration service, by consulting a DNS server update field in a previously stored user service profile database. The DNS server update field is illustrated in Table 1.

As a result of the determination, if the mobile station has subscribed to the DNS registration service, the AAA server determines in step S330 whether a Session ID included in the Accounting Stop Request message has already been registered. As a result of the determination, if the Session ID has not been registered, the AAA server ends the procedure under the judgment that DNS deletion on the session has already been performed. In addition, in step S330, the AAA server prevents a source packet data service node from releasing a data session and deleting an IP address of the mobile station registered in the DNS server, when the IP address is maintained even though a handoff occurs between packet data service nodes in a Mobile IP allocation service.

However, if the Session ID included in the Accounting Stop Request message has been registered, the AAA server determines in step S340 whether the session is continued or stopped, by consulting a Session Continue field included in the Accounting Stop Request message. Here, if the Session Continue field is set to '0', the AAA server determines that the session is continued.

If it is determined that the session is stopped, the AAA server transmits in step S350 a DNS query message with an MSID and receives a corresponding DNS query response message. The DNS query message and the DNS query response message have a format illustrated in FIG. 8, and the contents of the major fields of the DNS query message used in the present invention are as follows (* In this regard, please refer to RFC 1035).

DNS Header
    Q/R=0 (query)
    opcode=0 (standard query)
    Query Section
    name=MS's domain name
    type=1 (host address)
    class=1 (Internet)

Figure 8:
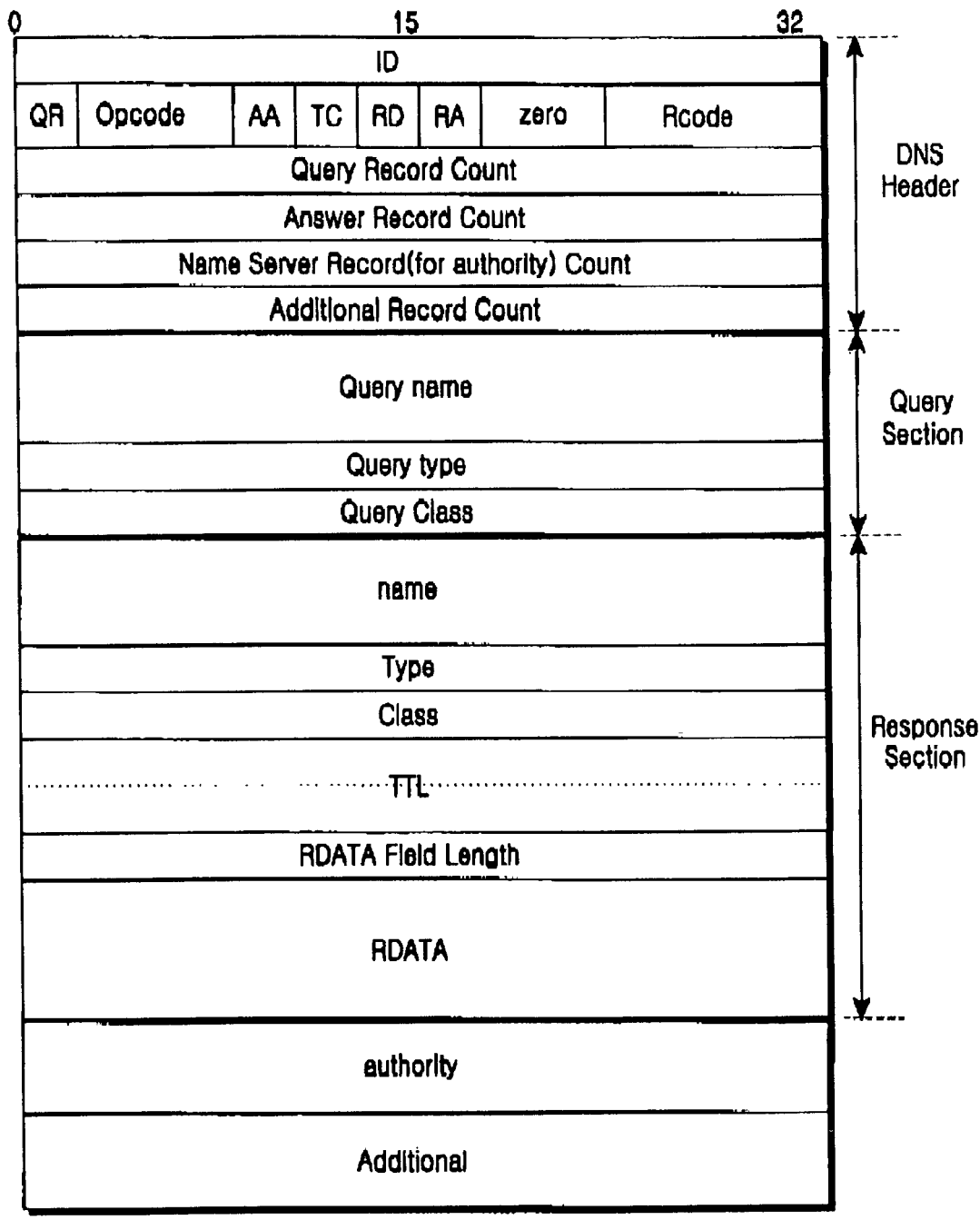
FIG. 8 illustrates a format of a DNS query message.

In addition, the contents of the major fields of the DNS query response message of FIG. 8, used in the present invention, are as follows.

DNS Header
    Q/R=0 (query)
    opcode=0 (standard query)
    Query Section
    name=MS's domain name
    type=1 (host address)
    class=1 (Internet)
    RDATA=MS's IP address In step S360, the AAA server compares an IP address included in the DNS query response message with an IP address to be deleted (i.e., an IP address included in the received Accounting Stop Request message). If they are identical to each other, the AAA server proceeds to step S370. Otherwise, if the IP addresses are not identical to each other, the AAA server ends the procedure having determined that a new IP address of the mobile station has already been registered.

In step S370, the AAA server generates a DNS delete request message using a domain name and IP address of the mobile station, and transmits the generated DNS delete request message to the DNS server. If the DNS server accomplishes a corresponding process in response to the DNS delete request message and transmits a DNS delete response message, the AAA server receives in step S380 the DNS delete response message and recognizes successful deletion of the domain name. Here, the DNS delete request message and the DNS delete response message have the format illustrated in FIG. 7, in which "Opcode" is set to a value indicating "delete."

Second Embodiment

In the second embodiment, a network element performing a function of allocating an IP address, i.e., a packet data service node or a home agent registers a domain name and an IP address of a mobile station in a DNS server. To this end, the packet data service node or the home agent includes an operating program required for the present invention, i.e., a DNS client program, and the operating program performs a message exchange with the DNS server.

The embodiment will be separately described for an operation of registering a domain name by a packet data service node and an operation of registering a domain name by a home agent.

Figure 9:
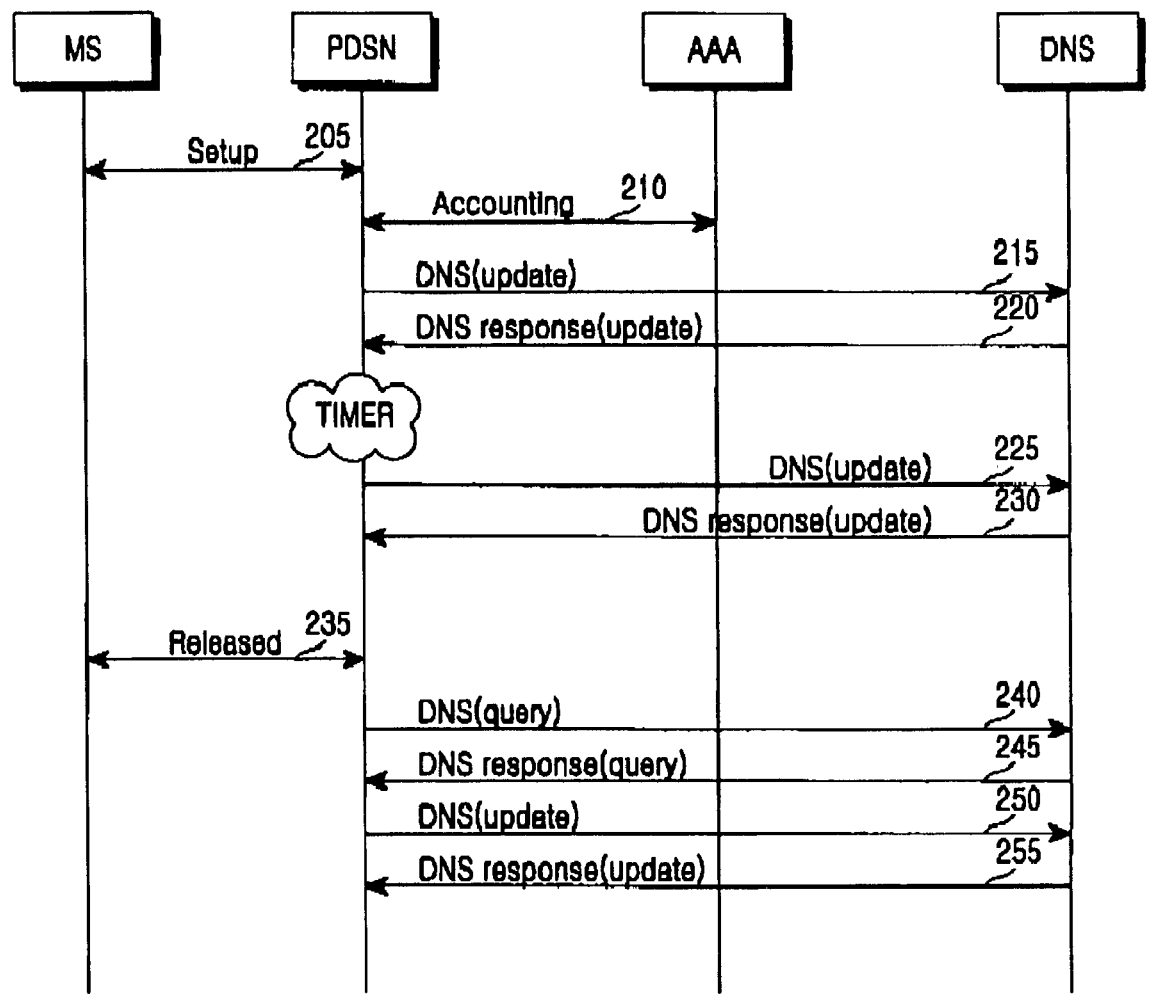
FIG. 9 is a message flow diagram illustrating a procedure for registering a domain name by a packet data service node according to a second embodiment of the present invention.

FIG. 9 is a message flow diagram illustrating a procedure for registering a domain name by a packet data service node according to the second embodiment of the present invention. Referring to FIG. 9, in step 205, a packet data service node (PDSN) allocates a public IP address through LCP (Link Control Protocol, authentication, and IPCP processes when setting up a PPP data session in order to initiate a packet call with a mobile station (MS). Here, since a procedure for allocating an IP address is well known in the art, a detailed description of the procedure will not be provided.

After allocating an IP address, the packet data service node performs an accounting process through an accounting message exchange with the AAA server in step 210, and then transmits to a DNS server a DNS update request message including the allocated IP address and a user domain name granted to the mobile station in step 215. Then the DNS server accomplishes a DNS registration process in response to the DNS update request message, and transmits in step 220 a DNS update response message to the packet data service node. Here, a detailed procedure for transmitting the DNS update request message by the packet data service node will be described with reference to FIG. 11.

After transmitting the DNS update request message, the packet data service node monitors a timer set to a valid time for the corresponding mobile station. If the timer expires, the packet data service node retransmits the DNS update request message to the DNS server in step 225. The DNS server then adjusts a valid time TTL of a resource record for a domain name of the mobile station requested by the DNS update request message, and transmits in step 230 a DNS update response message to the packet data service node.

If a PPP inactivity timer expires or a release request is received from the mobile station, the packet data service node releases a data session set up between the mobile station and the packet data service node. Then the packet data service node transmits a DNS query message to the DNS server in step 240 in order to delete a resource record of the corresponding mobile station from the DNS server. In step 245, the DNS server transmits a DNS query response message including a registered IP address for a domain name of the mobile station.

The packet data service node analyzes the DNS query response message and determines whether the registered IP address of the mobile station is identical to an IP address to be deleted. That is, the packet data service node compares an IP address recognized by the packet data service node itself with an IP address included in the DNS query response message. As a result of the comparison, if they are not identical to each other, the packet data service node ends the procedure. However, if they are identical to each other, the packet data service node transmits a DNS delete request message for deleting the registered IP address to the DNS server in step 250, and receives a DNS delete response message in step 255. A detailed procedure for deleting a domain name by the packet data service node will be described with reference to FIG. 12.

Figure 10:
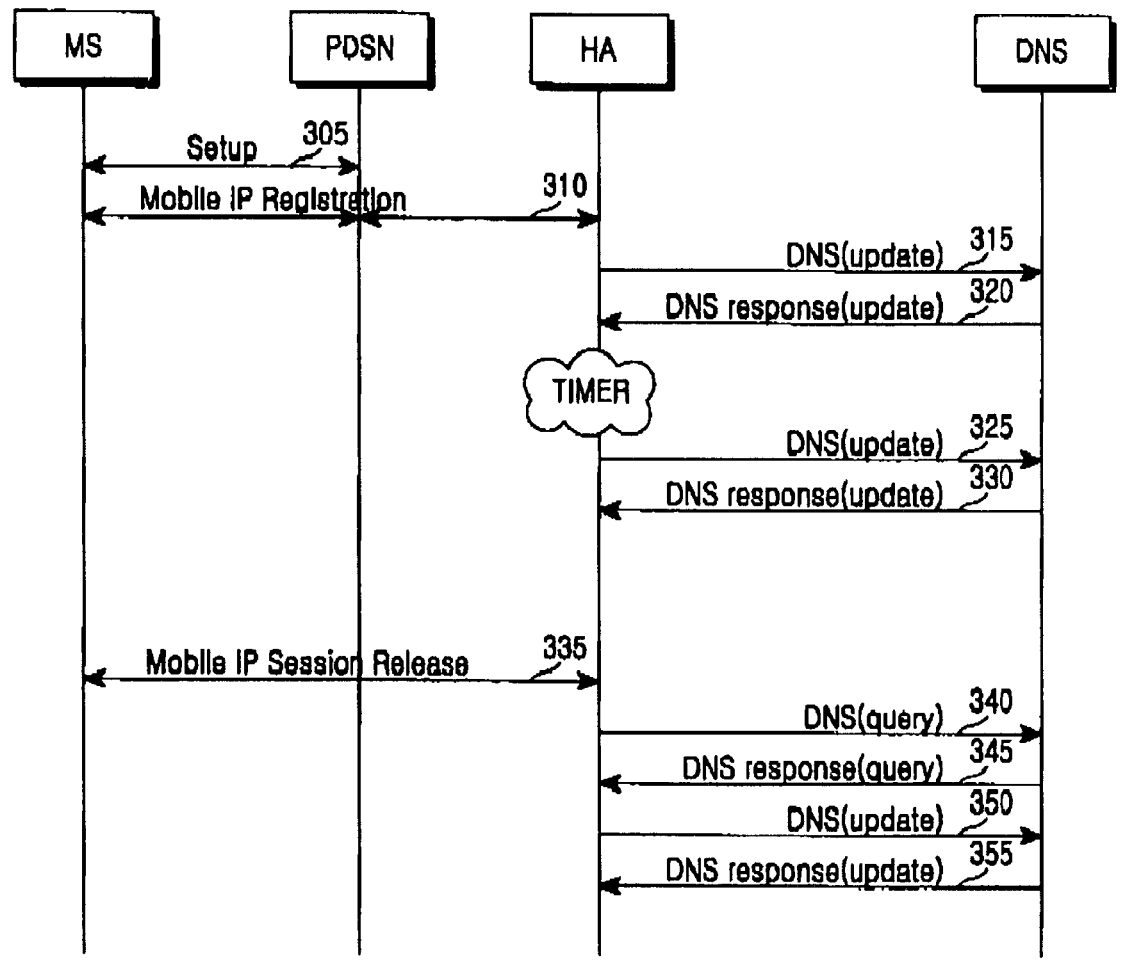
FIG. 10 is a message flow diagram illustrating a procedure for registering a domain name by a home agent according to the second embodiment of the present invention.

FIG. 10 is a message flow diagram illustrating a procedure for registering a domain name by a home agent according to the second embodiment of the present invention. Referring to FIG. 10, in step 305, a packet data service node sets up a PPP data session in order to initiate a packet call with a mobile station. In step 310, a home agent allocates an IP address to the mobile station through a Mobile IP registration procedure. Here, a procedure for allocating an IP address is well known in the art, so a detailed description of the procedure will not be provided.

After allocating an IP address, the home agent transmits to a DNS server a DNS update request message including the allocated IP address and a user domain name granted to the mobile station in step 315. The DNS server then accomplishes a DNS registration process in response to the DNS update request, and transmits in step 320 a DNS update response message. Here, a detailed procedure for transmitting the DNS update request message by the home agent will be described with reference to FIG. 11.

After transmitting the DNS update request message, the home agent monitors a timer set to a valid time for the corresponding mobile station. If the timer expires, the home agent retransmits the DNS update request message to the DNS server in step 325. The DNS server then adjusts a valid time TTL of a resource record for a domain name of the mobile station requested by the DNS update request message, and transmits in step 330 a DNS update response message to the home agent.

If a bind list timer expires in the home agent or a release request is received from the mobile station, a Mobile IP data session set up between the mobile station and the home agent is released in step 335. Then the home agent transmits a DNS query message to the DNS server in step 340 in order to delete a resource record of the corresponding mobile station from the DNS server. In step 345, the DNS server transmits a DNS query response message including an IP address registered for a domain name of the mobile station.

The home agent analyzes the DNS query response message and determines whether the registered IP address of the mobile station is identical to an IP address to be deleted. That is, the home agent compares an IP address recognized by the home agent itself with an IP address included in the DNS query response message. As a result of the comparison, if they are not identical to each other, the home agent ends the procedure. However, if they are identical to each other, the home agent transmits a DNS delete request message for requesting the DNS server to delete the registered IP address in step 350, and receives a DNS delete response message in step 355. A detailed procedure for deleting a domain name by the home agent will be described with reference to FIG. 12.

Figure 11:
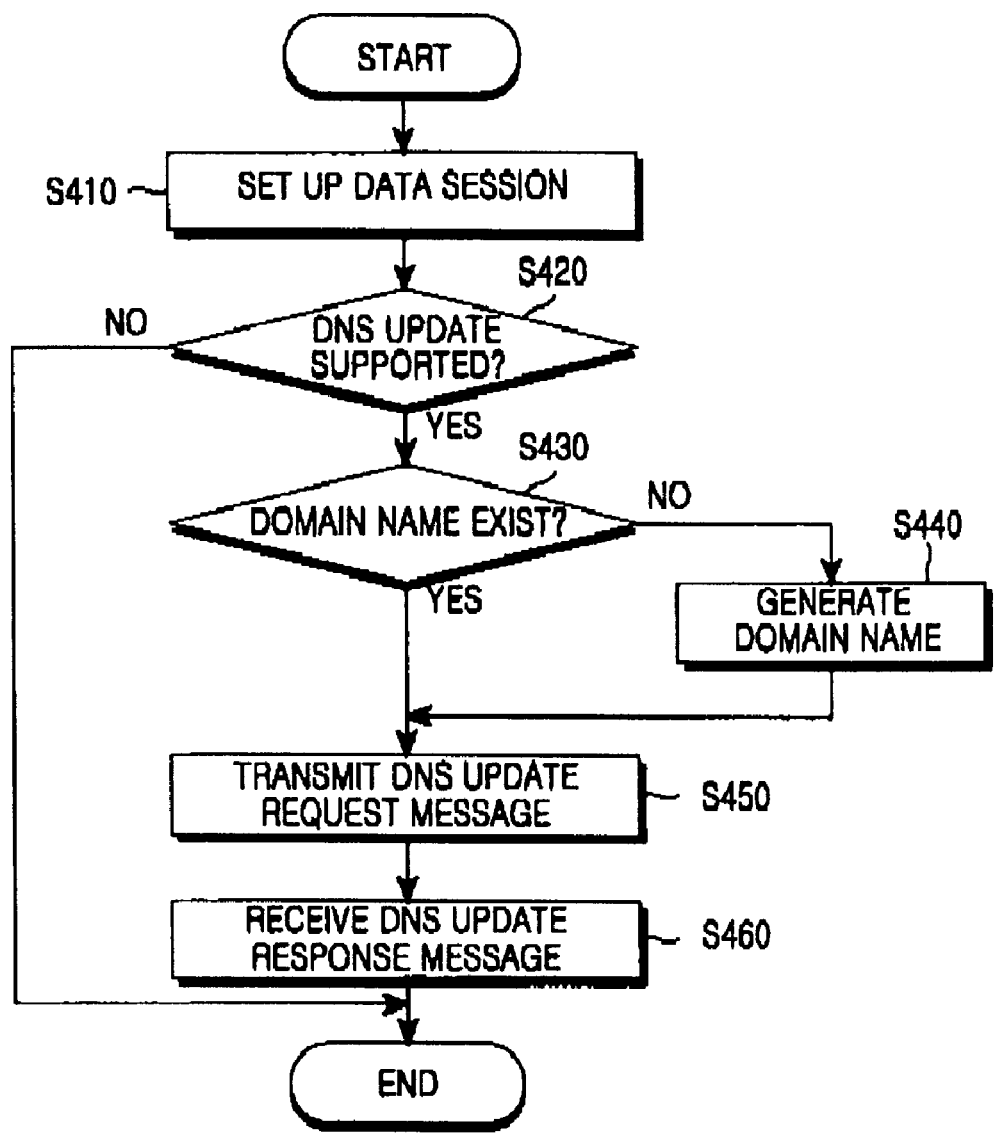
FIG. 11 is a flow chart illustrating a procedure for registering a domain name by a packet data service node or a home agent according to the second embodiment of the present invention.

FIG. 11 is a flow chart illustrating a procedure for registering a domain name by a packet data service node or a home agent according to the second embodiment of the present invention. In the case of a Simple IP allocation service, each step of the procedure is performed by the packet data service node in a PPP authentication step. However, in the case of a Mobile IP allocation service, each step is performed by the home agent in a Mobile IP registration step. For convenience of explanation, a description of the procedure will be made with reference to the packet data service node.

Referring to FIG. 11, a packet data service node sets up a PPP data session with a mobile station and allocates an IP address in step S410, and determines in step S420 whether the mobile station has subscribed to a DNS registration service, by consulting a DNS server update field in a previously stored user service profile, indicating whether the mobile station is a subscriber to a DNS registration service. The DNS server update field is illustrated in Table 1. In addition, the user service profile is previously stored in the packet data service node or is provided from an AAA server in the authentication step.

As a result of the determination, if the mobile station has subscribed to the DNS registration service, the packet data service node determines in step S430 whether a domain name of the mobile station has already been stored in a user domain field of the user service profile. If the domain name of the mobile station is not registered, the packet data service node generates a domain name of the mobile station according to a prescribed rule in step S440. For example, when NAI 'userid@realm' composed of a user identifier of a mobile station and a name of a service provider is used, a user domain name of the mobile station can simply become 'userid.realm'. The generated domain name is added to the user service profile as a domain name field.

In step S450, the packet data service node generates a DNS update request message using the allocated IP address and the domain name generated (or previously stored) in step S440, and transmits the generated DNS update request message to the DNS server. The DNS update request message has a format illustrated in FIG. 7. If the DNS server accomplishes a corresponding process in response to the DNS update request message and transmits a DNS update response message, the packet data service node receives in step S460 the DNS update response message and recognizes a success in DNS update.

Figure 12:
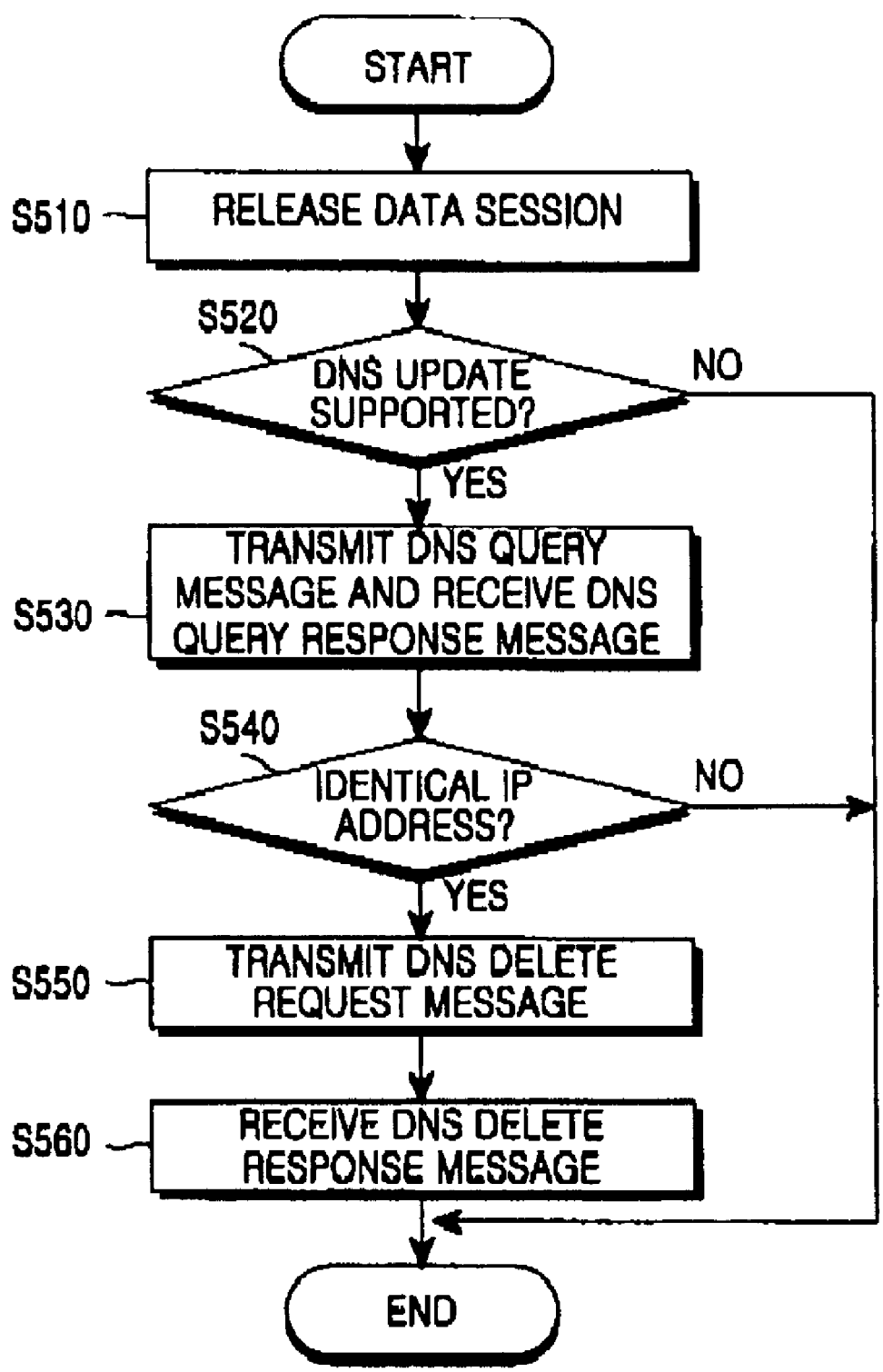
FIG. 12 is a flow chart illustrating a procedure for deleting a domain name by a packet data service node or a home agent according to the second embodiment of the present invention.

FIG. 12 is a flow chart illustrating a procedure for deleting a domain name by a packet data service node or a home agent according to the second embodiment of the present invention. Each step of the procedure is performed when a PPP data session is released in the packet data service node or a Mobile IP data session is released in the home agent. For convenience of explanation, a description of the procedure will be made with reference to the packet data service node.

Referring to FIG. 12, if a data session is closed in step S510, a packet data service node determines in step S520 whether the mobile station has subscribed to a DNS registration service, by consulting a DNS server update field in a previously stored user service profile, indicating whether the mobile station is a subscriber to a DNS registration service. The DNS server update field is illustrated in Table 1. In addition, the user service profile is previously stored in the packet data service node or is provided from an AAA server in the authentication step.

As a result of the determination, if the mobile station has subscribed to the DNS registration service, the packet data service node transmits to the DNS server a DNS query message including an identifier of the mobile station and receives a DNS query response message in step S530. The DNS query message and the DNS query response message have a format illustrated in FIG. 8.

In step S540, the packet data service node compares an IP address included in the DNS query response message with an IP address to be deleted. As a result of the comparison, if they are identical to each other, the packet data service node proceeds to step S550 to delete a domain name registered for the mobile station. However, if they are not identical to each other, the packet data service node ends the procedure having determined that a new IP address of the mobile station has already been registered.

In step S550, the packet data service node generates a DNS delete request message using the domain name and the IP address of the mobile station, and transmits the generated DNS delete request message to the DNS server. If the DNS server accomplishes a corresponding process in response to the DNS delete request message and transmits a DNS delete response message, the packet data service node receives in step S560 the DNS update response message and recognizes successful deletion of the domain name. Here, the DNS delete request message and the DNS delete response message have the format illustrated in FIG. 7, in which "Opcode" is set to a value indicating "delete."

Security of DNS Server

In order for the DNS server to safely exchange messages with an AAA server, a packet data service node or a home agent, a security extension (see RFC 2535) with a signature is needed at the rear of the message. The use of a DNS security extension guarantees that a received response message is a correct response message for the request message transmitted to the DNS server (transaction authentication). To this end, the following two plans have been proposed.

TSIG (Transaction SIGnature) which is indicated in RFC 2845, a first plan, uses a secret key shared by an AAA server (or a packet data service node or a home agent) and a DNS server. That is, if the AAA server, a client of the DNS server, generates a signature for a DNS request using a one-way keyed hash function and transmits the generated signature, the DNS server receives the signature and determines whether a message transmitted by the AAA server is changed, using the same algorithm as the AAA server and the shared secret key. Here, input values of the hash function are as follows.

digest component of DNS request message:
DNS Message (request)
TSIG Variables (request)
digest component of DNS response message:
Request MAC (Media Access Control)
DNS Message (response)
TSIG Variables (response)

In the case of the first plan, although various hash functions can be used, HMAC-MD5 (Hashed Message Authentication Codes—Message Digest) should be necessarily supported for compatibility.

Figure 13:
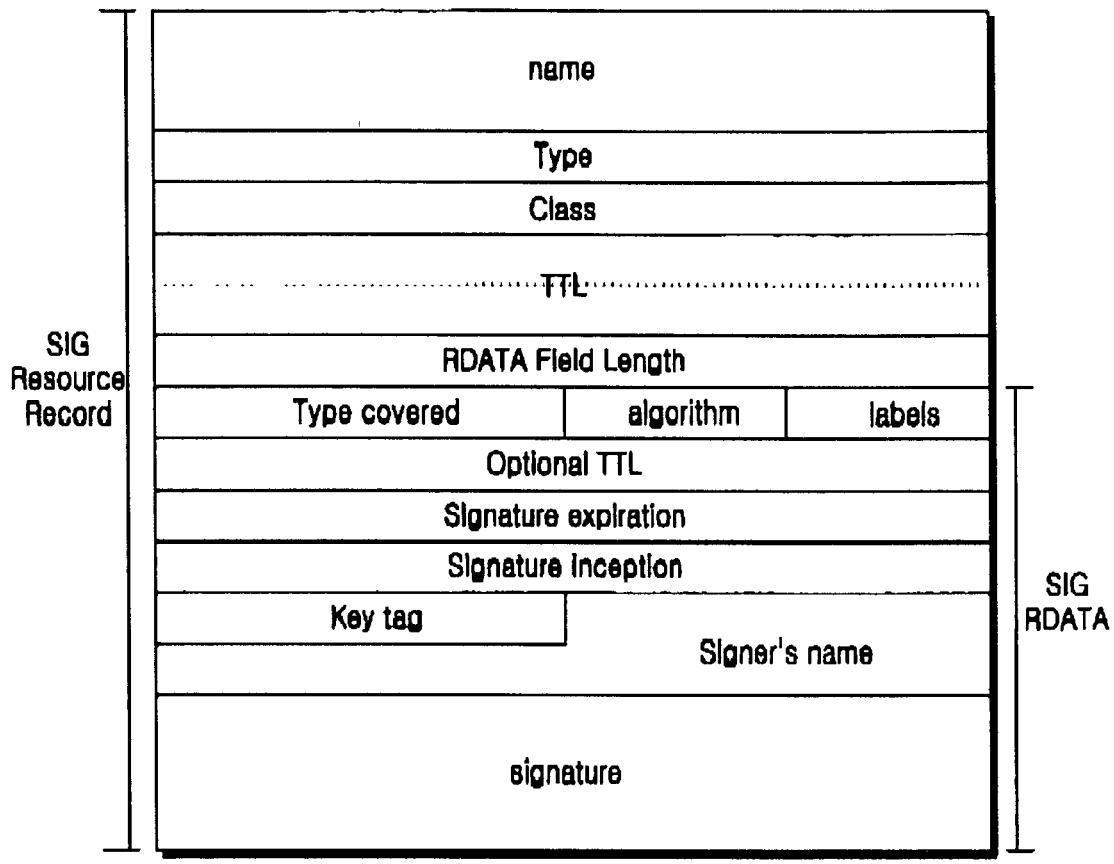
FIG. 13 illustrates a format of a SIG resource record for a DNS message.

SIG(0) (SIGnature) (RCF 2931), a second plan, uses a public key-based encryption technique. Here, the public key is stored in a key resource record by the DNS server, and a private key is possessed by the AAA server, a client of the DNS server. A detailed format of a SIG resource record for the DNS message is illustrated in FIG. 13, and input values of an encryption function are as follows.

DNS request message
a part except a signature field among RDATA of SIG resource record
a DNS request message except UDP/IP header (however, request SIG(0) is excepted)
DNS response message
a part except a signature field among RDATA of SIG resource record DNS request message a DNS response message except UDP/IP header (however, response SIG(0) is excepted)

As described above, each time a mobile station sets up a data session and is allocated an IP address, the present invention registers IP address information of the mobile station in a DNS server along with a domain name of the mobile station. Therefore, although an IP address of the mobile station is dynamically changed, a correspondent node (CN), if it recognizes only the domain name of the mobile station, can first transmit a data packet to the mobile station. As a result, the present invention can enable packet data call destination, and thus operate the mobile station as a home page server.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for accessing a packet data service by a mobile station having a unique domain name, comprising the steps of:
    (a) allocating to the mobile station an IP (Internet Protocol) address matched to the unique domain name for the packet data service;
    (b) storing the unique domain name and the allocated IP address in a domain naming system (DNS) server;
    (c) monitoring, by a home agent, a time set to a valid time for the mobile station;
    (d) providing the packet data service to the mobile station using the allocated IP address; and
    (e) deleting the unique domain name and the IP address from the DNS server, when the packet data service of the mobile station is ended;
    wherein step (b) further comprises the steps of:
        receiving an accounting start request message including the allocated IP address from an AAA (Authentication, Authorization and Accounting) server;
        transmitting a DNS update request message including the allocated IP address and the unique domain name of the mobile station to the DNS server; and
        receiving a DNS update response message corresponding to the DNS update request message from the DNS server.

2. The method of claim 1, wherein the IP address is allocated by a packet data service node (PDSN) which connects the mobile station to the Internet service network.

3. The method of claim 2, wherein step (b) further comprises the steps of:
    transmitting a DNS update request message including the allocated IP address and the unique domain name of the mobile station from the packet data service node to the DNS server; and
    receiving a DNS update response message corresponding to the DNS update request message from the DNS server.

4. The method of claim 1, wherein the IP address is allocated by a home agent (HA) which manages mobility information of the mobile station.

5. The method of claim 4, wherein step (b) further comprises the steps of:
    transmitting a DNS update request message including the allocated IP address and unique the domain name of the mobile station from the home agent to the DNS server; and
    receiving a DNS update response message corresponding to the DNS update request message from the DNS server.

6. A method for supporting a packet data service of a mobile station by an AAA (Authentication, Authorization and Accounting) server in a wireless communication system, comprising the steps of:
    (a) receiving an accounting start request message indicating that a data session for a packet data service to a mobile station is set up;
    (b) generating a DNS(Domain Naming System) update request message including an IP address allocated to the mobile station and a domain name granted to the mobile station;
    (c) transmitting to a DNS server the DNS update request message; and
    (d) deleting the domain name and the IP address from the DNS server, when the packet data service of the mobile station is ended;
    wherein step (c) further comprises the step of repeatedly transmitting the DNS update request message to the DNS server at predetermined periods.

7. The method of claim 6, wherein the IP address is allocated by a packet data service node (PDSN) which connects the mobile station to an Internet service network.

8. The method of claim 6, wherein the IP address is allocated by a home agent (HA) which manages mobility information of the mobile station.

9. The method of claim 6, wherein step (a) further comprises the steps of:
    extracting a session identifier for identifying the data session from the accounting start request message;
    determining whether the extracted session identifier was already registered; and
    registering the session identifier if the session identifier was not registered.

10. The method of claim 6, wherein step (a) further comprises the steps of:
    extracting a session start field from the accounting start request message; and
    determining that the value of the session start field indicates a start of the data session.

11. The method of claim 6, wherein step (b) further comprises the steps of:
    determining whether a domain name of the mobile station has already been registered; and
    generating a domain name of the mobile station according to a prescribed rule, if a domain name of the mobile station is not registered.

12. A method for supporting a packet data service of a mobile station by PDSN or HA in a wireless communication system, comprising the steps of:
    (a) setting up a data session for a packet data service with a mobile station, and allocating an IP address for the packet data service to the mobile station;
    (b) generating a DNS update request message including an IP address allocated to the mobile station and a domain name granted to the mobile station;
    (c) transmitting to a DNS(Domain Naming System) server the DNS update request message; and
    (d) deleting the domain name and the IP address from the DNS server when the packet data service of the mobile station is ended;
    wherein the step (c) comprises the step of repeatedly transmitting the DNS update request message to the DNS server at predetermined periods.

13. The method of claim 12, wherein the IP address is allocated by a packet data service node (PDSN) which connects the mobile station to an Internet service network.

14. The method of claim 12, wherein the IP address is allocated by a home agent (HA) which manages mobility information of the mobile station.

15. The method of claim 12, wherein step (b) further comprises the steps of:
  determining whether a domain name of the mobile station has already been registered; and
  generating a domain name of the mobile station according to a prescribed rule, if the domain name of the mobile station has not been registered.

16. A method for supporting a packet data service of a mobile station by PDSN or HA in a wireless communication system, comprising the steps of:
  (a) setting up a data session with the mobile station, and releasing the data session with the mobile station during a packet data service, using an IP address allocated to the mobile station and a domain name granted to the mobile station;
  (b) transmitting to a Domain Naming System (DNS) server a DNS query message including the domain name of the mobile station;
  (c) upon receiving a DNS query response message in reply to the DNS query message, comparing an IP address included in the DNS query response message with the IP address of the mobile station;
  (d) generating a DNS delete request message including the IP address and the domain name of the mobile station and transmitting the DNS delete request message to the DNS server, when the IP address included in the DNS query response message is identical to the IP address of the mobile station; and
  (e) deleting the domain name and the IP address from the DNS server when the packet data service of the mobile station is ended.

* * * * *